United States Patent [19]

Spevack

[11] 4,128,406
[45] Dec. 5, 1978

[54] CONTACT APPARATUS FOR MULTIPHASE PROCESSING

[75] Inventor: Jerome S. Spevack, New Rochelle, N.Y.

[73] Assignee: Deuterium Corporation, White Plains, N.Y.

[21] Appl. No.: 837,200

[22] Filed: Sep. 28, 1977

Related U.S. Application Data

[62] Division of Ser. No. 655,239, Feb. 4, 1976, Pat. No. 4,062,663.

[51] Int. Cl.$^2$ .............................................. B01D 47/10
[52] U.S. Cl. ........................................ 55/237; 55/455; 55/459 R; 55/DIG. 22; 55/259
[58] Field of Search .................................. 55/235–238, 55/455, DIG. 22, 259, 459 R

[56] References Cited

U.S. PATENT DOCUMENTS

| 223,403 | 1/1880 | Stewart | 55/455 |
|---|---|---|---|
| 1,684,020 | 9/1928 | Hawley | 55/455 |
| 2,093,994 | 9/1937 | Blom | 55/455 |
| 2,122,630 | 7/1938 | Williams | 55/455 |
| 3,651,619 | 3/1972 | Miura | 55/237 |
| 4,062,663 | 12/1977 | Spevack | 55/238 |

Primary Examiner—Bernard Nozick
Attorney, Agent, or Firm—Hall & Houghton

[57] ABSTRACT

A processing method and apparatus are provided in which flows of a plurality of phases, at least one of which is a liquid phase, are intimately contacted and subjected to centrifugal force by being passed as a cocurrent turbulent flow circumferentially, axially, and inwardly and outwardly through sets of openings in the walls of one or more cylindrical chambers having first and second elements coaxially positioned in a housing, the openings being provided with flow guide means for directing said cocurrent flows in the same circumferential direction at all times, and the axial direction of passage of said cocurrent flows in preferred embodiments of the invention being non-ascending and hence not counter to the force of gravity. The flow guide means may be deflectors extending from said walls outside of one and inside of the other of said first and second elements, with their free ends directed either counter to or in the direction of said cocurrent flows through said openings in said walls, for providing unimpeded circumferential flow paths inside of one and outside of the other of said elements and reducing pressure loss in the processing. The efficiency of the apparatus may be enhanced by including flow contour members defining said flow paths. The system is particularly useful where the processed phases comprise a solid phase.

11 Claims, 11 Drawing Figures

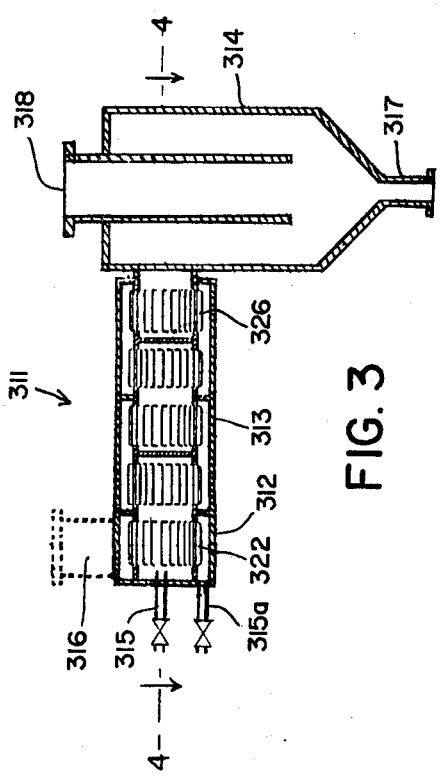
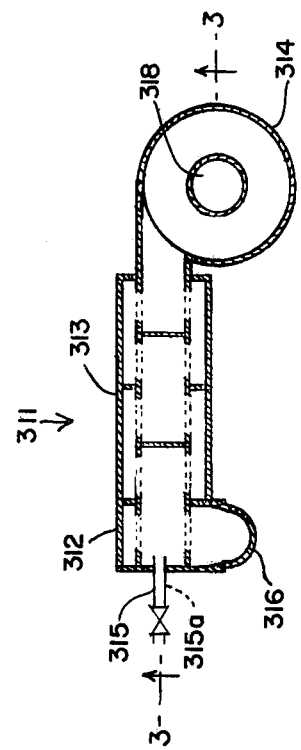
FIG. 3
FIG. 4
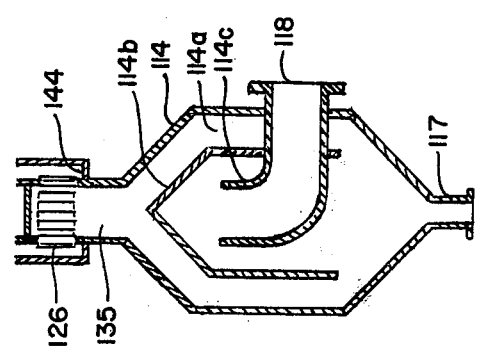
FIG. 2
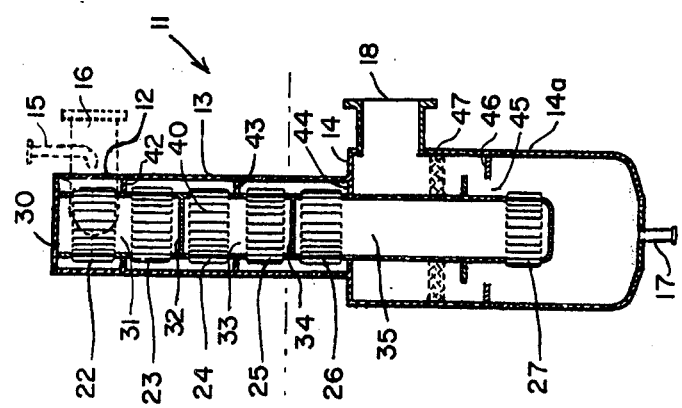
FIG. 1

CONTACT APPARATUS FOR MULTIPHASE PROCESSING

This is a division, of application Ser. No. 655,239 filed Feb. 4, 1976 now U.S. Pat. No. 4062663.

BACKGROUND OF THE INVENTION

1. Field of the Invention

This invention relates to an apparatus for the physical and/or chemical processing of substances in multiphase flow systems. The contacting occurs between two or more cocurrent flows of separate phases, e.g. gas and liquid phases or different liquid phases, either of which may also include a solid phase, or liquid and solid phases. The advantages of the invention thus are applicable in a broad field.

2. Description of the Prior Art

In the field of gas purification methods and apparatus, it has been known to clean a contaminated gas containing noxious fumes, chemical gases and/or dust particles, such as flue gas, stack gas, chemical process gases, industrial air exhausts and the like, by passing flows of the gas and a scrubbing liquid cocurrently through contacting devices of various types for wetting the dust particles therein for collection and for solubilizing other of such contaminants into the scrubbing liquid. Among the systems known is a type in which a gas is passed tangentially into a cylinder through charging slits and the liquid is drawn upward along the inner wall of the cylinder by utilizing the whirling and ascending force of the gas, and the liquid so drawn into the cylinder is atomized by the gas entering the cylinder. In one such system, described in Miura U.S. Pat. No. 3,651,619, the gas to be treated is charged into a cylinder though lower slits of a cylinder having a set of upper and lower slits formed in the tangential direction in the side wall thereof, and a liquid at the bottom of said cylinder is drawn by the whirling and ascending force of the gas to cause it to rise in the form of liquid film along the inner wall of the cylinder, which liquid is then atomized by the gas entering from the slits, thus centrifugally separating the liquid containing impurities due to the whirling force of the gas when the gas is discharged from the upper slits. Devices of this type have various disadvantages. The upwardly flowing gas is required to elevate the liquid and move it in the upward direction counter to the force of gravity and must expend considerable energy for so doing, thereby causing loss of pressure and expansion of the gas in passing through the apparatus, generally requiring the use of costly gas compression equipment and substantial expenditures for the power therefor. Also in ascending cocurrent mixed phase systems, the force of gravity tends to cause the heavier phase to become separated from the lighter phase. Furthermore, in devices of this type the weight ratio of the liquid to the gas flow is limited, the maximum quantity of liquid flow being dependent on the velocity of the gas flow.

SUMMARY OF THE INVENTION

It is an object of the present invention to provide an apparatus the features of which may be used advantageously not only for gas and liquid contact without the foregoing disadvantages, but also for processing mixed phases comprising more than one liquid phase and comprising liquid and solid phases. In processing systems involving intimate contact of mixed gas and liquid phases in a cocurrent flow, in accordance with this invention the processing is effected by passing said mixed phases as a cocurrent turbulent flow circumferentially, axially and inwardly and outwardly through sets of openings in the walls of one or more cylindrical chambers having first and second elements coaxially positioned in a elongated housing, the openings being provided with flow guide means for directing said cocurrent flow in the same circumferential direction at all times. The axial direction of passage of said cocurrent flow in preferred embodiments of the invention is non-ascending and hence not counter to the force of gravity. In accordance with such embodiments the apparatus is positioned with said axial direction of passage disposed horizontally or at a downward inclination of 0° to 90° therefrom. In such non-ascending systems, and in the latter case especially, the positive effect of the force of gravity acting with the centrifugal forces generated by the circumferential motion aids the mixing and processing of the cocurrent multiphase flow, e.g. of gas and liquid phases, to the maximum as it descends from the upper to the lower sections of the apparatus. Such non-ascending and especially the vertical downward flow is particularly advantageous where it is an object to minimize extraction of energy from or loss of pressure in the gas being processed, or to minimize separation of the mixed phases during processing, or to minimize consumption of power for processing the gas. Moreover, in such non-ascending flow systems, the quantity of liquid relative to a prescribed quantity of gas being processed may be readily varied by adjustment of the liquid flow rate and can exceed the quantity of liquid which could be employed in the ascending flow systems of the prior art. Other objects of the invention are to provide efficient apparatus for contacting flows of a plurality of other different phases (e. g. of gas, liquid and solid phases; of two or more different liquid phases; or of liquid and solid phases) for chemical and/or physical processing thereof in a centrifugal force field, with or without formation of a gas or a solid as a result of chemical reaction between components of said phases during such processing, and to provide features of construction for improving the efficiency and broadening the scope of applicability of apparatus of the class described, particularly where the processed phases comprise a solid phase.

Further objects and advantages of the invention, contributing to accomplishing the foregoing objects, will be apparent from the following description of preferred embodiments of the invention.

BRIEF DESCRIPTION OF THE DRAWINGS

In the accompanying drawings of embodiments illustrative of the invention:

FIG. 1 is a diagrammatic vertical section of a first embodiment, having gas and liquid contact elements in which the axial component of cocurrent flow is vertically downwardly in the direction of the force of gravity, and having a centrifugal type gas separator at the bottom end;

FIG. 2 is a diagrammatic vertical section of an alternate form of separator employable in lieu of the form thereof shown in FIG. 1;

FIG. 3 is a diagrammatic vertical section of a second embodiment, taken at the line 3—3 of FIG. 4 looking in the direction of the arrows;

FIG. 4 is a diagrammatic horizontal section of the embodiment of FIG. 3, taken at the line 4—4 of FIG. 3 looking in the direction of the arrows;

DESCRIPTION OF PREFERRED EMBODIMENTS

Figure 5:
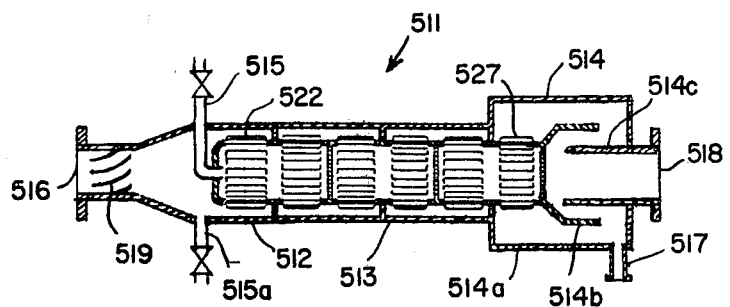
FIG. 5 is a diagrammatic horizontal section of a third embodiment, particularly adapted for in-line installations.

In the embodiments of the invention illustrated in FIG. 1, there is provided an apparatus for processing a plurality of phases, at least one of which is a liquid phase, comprising in combination an elongated housing 11 having communicating input, process and output sections 12, 13, 14 connnected for passing flows of each of said phases as a turbulent cocurrent flow from the input section 12 into the input end of the process section 13, through said process section 13 and from its output end into the output section 14. Connected to said input section 12 of housing 11 are inlet means 15, 16, indicated in phantom lines, for delivering flows of liquid phase and of gaseous phase, respectively, for processing. Connected to said output section 14 of housing 11 are outlet means 17, 18 for discharging therefrom the processed phases, e.g. processed liquid via 17 and processed gas via 18. The process section 13, which is illustrated as cylindrical but may be of some other elongated shape suitable for maintaining generally circumferential motion of the flows therein, is axially positioned with the center of its output end leading to the output section 14 at an elevation no higher than the elevation of the center of its input end which is connected to the input section 12. The said output section 14 comprises a circular cross section chamber 14a and the means 27 for causing circumferential movement of the said cocurrent flow therein, hereinafter described. In this embodiment, the multiphase contact means 22-26 in said housing 11 is shown as having at least one pair, i.e. a plurality of pairs, of first and second mixing elements 22-23, 24-25 and an additional first mixing element 26. Each of said mixing elements 22-26 has a cylindrical chamber closed at one end and open at the other end, each pair of said elements being joined together at their open ends. In the form shown the mixing elements 22 and 23 have closed ends at 30 and 32, respectively, and have their open ends joined together at 31; the closed end 30 of mixing element 22, which is disposed in the input section 12, is exemplified as constituting part of the housing 11; the mixing elements 24 and 25 have closed ends at 32 and 34, respectively, and have their open ends joined at 33; and the additional first mixing element 26 has its closed end at 34 and open end at 35. Said closed ends at 32 and 34 may be closed individually or by common walls, as shown. The walls of each of the said cylindrically chambered mixing elements 22-26 have wall openings 40 therein for the passage of said cocurrent flow therethrough, said wall openings 40 being provided with flow guide means shown as in the form of deflectors extending outwardly from said walls for directing the said cocurrent flow in the same circumferential direction into the chamber of the first mixing element. e. g. 22, 24 or 26, and out of the chamber of the second mixing element, e. g. 23 or 25, all said mixing elements being in axial alignment and disposed coaxially in said housing 11. The first mixing element 22 of the first pair of said at least one pair is disposed in said input section 12, and mixing elements 23-25 and said additional first mixing element 26 are disposed in said process section 13. The open end 35 of said additional mixing element 26 is disposed in said output section 14 and delivers said cocurrent flow to the said means 27 in said output section 14 for causing circumferential movement of the flows therein. Said means 27 is shown as a second mixing element 27 of the same kind as mixing elements 23 and 25 and performs like functions with respect to further processing of the cocurrent flows. Partitions 42, 43 and 44 extend between said housing 11 and each pair of mixing elements, e. g. between mixing elements 22-23 and 24-25, intermediate the first and second elements thereof, and also extend between said housing 11 and said additional first mixing element 26, intermediate the wall openings 40 and the open end 35 thereof, for passing at least a principal part of the said cocurrent flow from said input section 12 to said process section 13 and therefrom to said output section 14 through the first and then the second mixing elements of each pair of mixing elements and through said additional first mixing element in sequence. Said partition may be secured to the walls of said mixing elements with or without being secured to said housing 11.

Further referring to FIG. 1, the illustrated means for causing circumferential movement of the processed flows in said output section 14 comprises the circular cross section chamber 14a in combination with the additional second mixing element 27 disposed coaxially therein, the open end of said additional second mixing element 27 being joined at 35 with the open end of said additional first mixing element 26.

The embodiment illustrated in FIG. 1 is adapted for imparting to the cocurrent flow circumferential motion as well as inward and outward motion through the wall openings of the mixing elements together with a nonascending, e.g. downward, component of axial motion. Its input section 12 has a circular cross section feed unit coaxial with said process section 13, and said inlet means 15, 16 may comprise a tangential or convoluted inlet 16 for feeding at least one of said phases, e.g. the gas phase, more particularly the phase presenting the greater volume of flow for processing, into said input section in a direction circumferentially the same as that of the flows into the chamber of said first mixing element 22 disposed in said input section 12. In the exemplified form, the liquid phase, which presents the lesser volume of flow for processing, may be supplied to input section 12 in any desired manner and preferably as shown at 15 in FIG. 1 by being sprayed into the inlet 16. As illustrated, the gas flows through the wall openings, e.g. 40, in said first mixing element 22 at increased velocity cause atomization of the liquid and impart circumferential motion to the flows of mixed gas and liquid phases as the flows pass inside the chamber of said first mixing element 22 to the second mixing element 23 joined therewith.

As shown in FIG. 1, the output section 14 may be provided with its liquid outlet 17 at its bottom and with a gas outlet 18 spaced therefrom by a reverse flow elongated passage 45 surrounding the elongated connection at 35 between mixing elements 26 and 27. This passage 45 may be provided with baffling means 46 and/or with a conventional liquid entrainment separator 47. With this arrangement, the housing 11, with proper adjustment of the location of the liquid and gas outlets 17, 18, may be positioned at any desired angle in the range of non-ascending flow, i.e. from 0° to 90° from horizontal.

The illustrated means for causing circumferential movement of the flows in the output section 14, namely, cylindrical walls 14a and additional second mixing element 27, is not intended to be restrictive of the forms of centrifugal separating means which may be employed in the arrangement of FIG. 1, which may take any desired form. Thus, as shown in FIG. 2, which utilizes similar reference numerals to those of FIG. 1 increased by 100, the additional first mixing element 126 may be connected at 135 to another form of centrifugal separator 114. In this other form, the axial input of the circumferentially moving cocurrent flow from mixing element 126 passes from its open end into an outwardly expanding annular discharge chamber 114a outside of a central conically topped cylinder 114b. Centrifugal force and dual reversal of the axial direction of flows into and out of said cylinder 114b, combine to separate the heavier and lighter phases, e.g. liquid and gas phases, and the gaseous phase in the illustrated embodiment exits via axial conduit 114c, which discharges to the gas outlet means 118. The separator 114 is provided with a heavier phase, e.g. liquid, outlet 117 suitably located for gravity drainage, and in this respect FIG. 2 shows liquid outlet 117 at the bottom of a vertically positioned separator 114.

FIGS. 3 and 4 illustrate an embodiment wherein the axis of the input section 312 and process section 313 is arranged in a non-ascending manner, e.g. horizontally. As shown in FIGS. 3 and 4, which utilize generally similar reference numerals to those of FIG. 1 increased by 300, the input section 312 may have one or more conveniently located liquid inlets, e.g. as at 315 and 315a or located as at 15 in FIG. 1. Liquid inlet 315 provides for spraying directly into the chamber of the first mixing element 322, whereas liquid inlet 315a provides for delivering to the feed unit outside of the wall openings of mixing element 322. In the FIG. 3 embodiment the components in the process section 313 are the same as those in the process section 13 of FIG. 1, and perform the same functions in substantially the same way depending on its non-ascending axial orientation. In this form the additional first mixing element 326 discharges the circumferentially moving cocurrent flow from its open end tangentially into a vertical axis cyclone type separator 314, in which centrifugal force and gravity combine to aid the separating of the heavier and lighter phases, e.g. liquid and gas, which separator includes liquid outlet means 317 and gas outlet means 318 at its lower and upper ends, respectively.

The arrangement of FIG. 5 is generally similar to those of FIGS. 1 and 3 previously described but is particularly adapted for in-line use. It utilizes generally similar reference numerals to those of FIG. 1 increased by 500. FIG. 5, as illustrated, has its axially aligned gas phase inlet 516 provided with means for imparting circumferential movement to the axially entering gas, e.g. spin vanes 519. Its input section includes one or more liquid phase inlet means, e.g. 515, 515a, arranged similar to the inlet means 315, 315a, described for FIGS. 3 and 4. The illustrated means, cylindrical walls 514a in combination with the additional second mixing element 527, maintain circumferential motion of the cocurrent flow of the processed phases in the output section 514, and the centrifugal force effect therein with the axial reversals of flow within the hood element 514b separates the heavier and lighter phases, e.g. liquid and gas. The heavier, e.g. liquid, phase is delivered to the liquid outlet means 517, and the lighter, e.g. gas, phase is delivered through the axial conduit 514c to the gas outlet means 518. The other components illustrated in the process section 513 are the same and perform similar functions as the corresponding components in the embodiments of FIGS. 1 and 3.

As diagramatically illustrated in FIGS. 1, 3 and 5, flow guide means, e.g. 40 of FIG. 1, in the outer walls of the chambers of the mixing elements, e.g. 22–27 of FIG. 1, may be formed by slitting the said chamber walls and outwardly inclining the partially severed portions to form the required wall openings and the flow guide means 40 as deflectors for directing the flows in the same generally circumferential direction inside and outside of the mixing elements. As there shown the wall openings and the flow guide means 40, which extend outwardly from the walls of first and second mixing elements, are elongated parallel to the axis of the mixing elements, e.g. 22–27 of FIG. 1. Preferred embodiments of the flow guide means are illustrated in FIGs. 6–7 and are next described.

Figure 6:
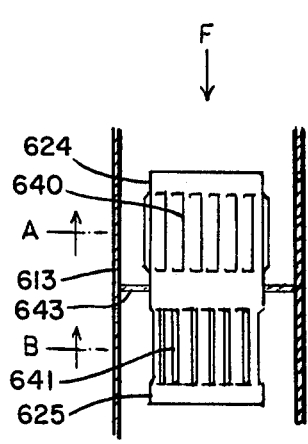
FIG. 6 is a diagrammatic detail, partially in verticle section, of a preferred form of mixing elements which may be employed in the contact means of any of said embodiments.
Figure 6A:
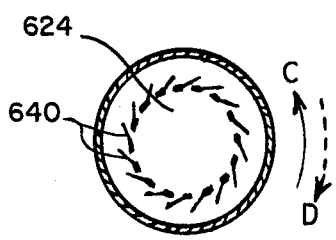
FIGS. 6A and 6B are diagrammatic cross sections taken at the lines A—A and B—B of FIG. 6, respectively.
Figure 6B:
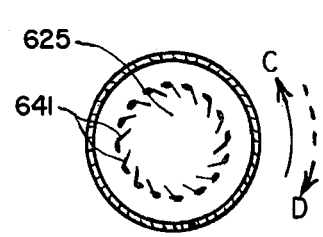

FIGS. 6, 6A and 6B exemplify a typical pair of first and second mixing elements, e.g. 624 and 625, located in a part of the housing, e.g. the process section 613, with a partition 643 therebetween. The axial direction of the cocurrent flow of the phases is indicated at F in FIG. 6. The flow guide means shown are preferably formed as elongated generally rectangular deflectors 640, 641, extending outwardly from the walls of said first mixing elements, e.g. 624, and inwardly from the walls of said second mixing elements, e.g. 625, with their free edges directed generally counter to the direction C of the circumferential flows outside and inside of said mixing elements, for guiding the said cocurrent flow through the wall openings in said elements and providing unimpeded circumferential flow paths inside of said first mixing elements and outside of said second mixing elements. This embodiment guides the said cocurrent flow through the said wall openings in a circumferential direction inwardly and outwardly of the mixing elements and minimizes pressure loss in the apparatus. Alternatively, the first mixing element, e.g. 624, may be provided with its deflectors extending inwardly from its wall with their edges extending generally in the same direction as the direction of the circumferential flow, i.e. as in FIG. 6B with flow direction D, and element 624 may have its deflectors extending outwardly from its wall with their edges extending generally in the same direction as the circumferential flow, i.e. as in FIG. 6A with flow direction D. This alternative arrangement provides for increased turbulence in the cocurrent flow just upstream of the wall openings as said flow is guided through the wall openings in a circumferential direction outwardly and inwardly of the chambers of the mixing elements.

Figure 7:
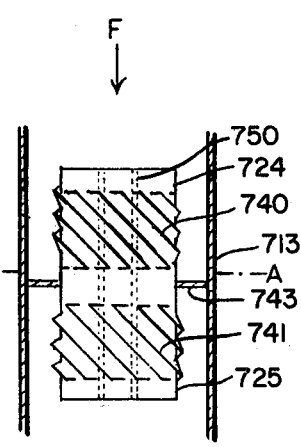
FIG. 7 is a diagrammatic detail, partially in verticle section, of another preferred form of mixing elements which may be employed in the contact means of any of said embodiments.

Whether the wall openings and deflector flow guide means are arranged as in FIG. 1 or as in FIGS. 6, 6A and 6B, in whole or in part, it may be desirable that the arrangement embody one or more other features, e.g. as illustrated in FIG. 7. FIG. 7 exemplifies a typical pair of first and second mixing elements, e.g. 724 and 725, located in a part of the housing, e.g. 713, with a partition, e.g. 743, therebetween. It illustrates embodiments wherein the wall openings and flow guide means 740 of at least one of said first mixing elements, e.g. 724, including at least the said first mixing element disposed in said input section, e.g. 722 (not shown), and/or wherein the wall openings and flow guide means 741 of at least one of said second mixing elements, e.g. 725, including at least the said second mixing element disposed in said output sections, e.g. 727 (not shown), are elongated obliquely relative to the axis of said mixing elements for imparting to the said flows a component of axial motion in the direction F toward the output end of said housing.

Figure 7A:
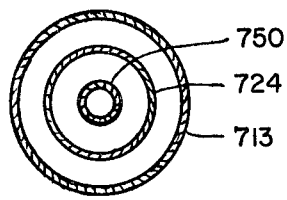

A further feature illustrated in FIGS. 7 and 7a is the cylindrical flow contour element 750 inside the chambers of the mixing elements which may be employed to aid in maintaining circumferential motion of the flows inside of the chambers and also to restrict the cross sectional area of the flow path inside the cylindrical walls of selected first and/or second mixing elements, e.g. 724 and/or 725, relative to that of the flow path external of such mixing elements. This feature is particularly advantageous for applications of the invention to regulate the relative velocities of flows inside and outside of the mixing elements and to provide an annular cross sectional hollow inside of said mixing elements for guiding the flows therein in circumferential paths, and is particularly preferred in systems involving large volumetric flows.

Figure 8:
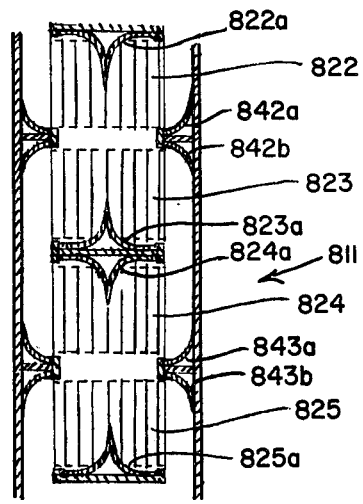
FIG. 8 is a diagrammatic partial sectional view of flow contour members which may be employed with the contact means in any of the foregoing embodiments.

FIG. 8 illustrates special constructions of flow contour members for streamlining the flow paths from the input section to the output section of any of the apparatus described herein, which may advantageously be adopted for one or more of the partitions between the housing and the mixing elements and/or for one or more of the closed ends inside of the mixing elements. In the illustrated embodiment, undesirable flow path space outside of the mixing elements may be occupied by solid or fabricated partition flow contour members, e.g. 842a, 842b, 843a, 843b, or some of them, constructed of greater width adjacent said housing 811 than adajcent said mixing elements for smoothing the flow paths between the mixing elements and the housing. Such partition members may be annularly curved, as shown. In addition, undesirable flow path space inside of the mixing elements may be occupied by solid or fabricated chamber flow contour members, e.g. 822a, 823a, 824a, 825a, or some of them, constructed conically shaped with apices extending from the closed ends into the chambers of the mixing elements coaxially therewith. Such chamber members may be curved taper as shown. Use of these features to smooth selected flow paths external to and internal of the mixing elements inhibits eddy currents in the circumferential flows and minimizes pressure loss in the apparatus. Their use is particularly desirable where one of the phases being processed is a solid phase, or where the processing of non-solid phases produces a solid phase therein, in as much as such construction inhibits the settling out of solid phase material at the indicated undesirable flow path spaces in the apparatus.

As will be apparent from the foregoing, in the illustrative embodiments above set forth, the housing for the mixing elements may also be regarded as being defined by the described partition flow contour members, when present, and thus as an elongated body of revolution of a straight, undulating, or irregular generatrix line of constant or varying shape, about an axis spaced from said line.

It will be appreciated that the present invention provides an apparatus for effecting the processing of a plurality of phases, at least one of which is a liquid phase, by intimately contacting and applying centrifugal force to said phases with the aid of apparatus as aforesaid, which apparatus comprises means for passing flows of said phases as a turbulent cocurrent flow inwardly and then outwardly through respective sets of openings in the walls of two or more cylindrical chambers, previously described coaxially positioned in a housing while passing said cocurrent flow downstream through said housing in an axial direction not counter to the force of gravity and while maintaining said cocurrent flow essentially in circumferential motion in the same direction inside of said chambers and between said chambers and said housing and recovering the processed liquid phase. In this apparatus the second phase of said plurality of phases may be a gaseous phase and may also be recovered after processing. In this method a third phase of said plurality may be a solid phase dispersed in said gaseous phase and may be recovered either in solution or suspension in said processed liquid phase. The phases may comprise components which chemically react to form at least one non-gaseous reaction product which may be recovered with theprocessed liquid phase, and which may comprise a solid phase reaction product, or one which comprises at least two substances one of which is relatively insoluble in said liquid phase while the other is relatively soluble therein. When the contacted phases comprise solid and liquid components which chemically react to produce at least one non-gaseous reaction product the latter may also be recovered with the processed liquid phase, and when the plurality of phases comprise components which chemically react to produce at least one gaseous reaction product the expansion of volume thereby produced increases the turbulence and velocity of the cocurrent flow of the phases. The two phases may both be liquid phases which are essentially immiscible, and at least one thereof may contain an emulsifying agent, and the process may form an emulsion of at least said two liquid phases as the processed liquid phase; on the contrary at least one of the two liquid phases may comprise a finely divided solid phase, and at least one of said liquid phases may contain a dispersant for said solid phase so that the processing forms an emulsion of said two liquid phases containing said solid phase dispersed therein as the processed liquid phase.

While there have been described herein what are at present considered preferred embodiments of the invention, it will be obvious to those skilled in the art that modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. An apparatus for processing cocurrent flows of separable phases, comprising in combination:
   (a) a housing having an input section, an output section and an intermediate section therebetween for passing said flows from said input section to said output section, having separate input means connected to said input section for feeding each of said phases thereinto, and having output means connected to said output section for discharging the processed phases therefrom, (b) said intermediate section comprising at least one pair of first and second mixing elements in axial alignment and disposed coaxially in said housing, each of said elements having a cylindrical chamber closed at one end and open at the other end, each pair of said elements being joined together at their open ends, the walls of each of said chambers having wall openings therein for the passage of said flows therethrough, said wall openings being provided with flow guide deflectors extending from said walls for directing the said flows in the same circumferential direction into the chamber of the first mixing element and out of the chamber of the second mixing element, said deflectors extending from said walls inside of one and outside of the other of a pair of elements, and (c) a partition extending between said housing and each said pair of mixing elements intermediate the first and second mixing elements thereof for passing at least a principal part of said flows through the first and second mixing elements of each said pair in sequence.

2. Apparatus according to claim 1, wherein said deflectors extend outwardly of the walls of the first mixing element and inwardly of the walls of the second mixing element of each said pair with their free edges directed counter to the flows therethrough, for guiding said flows through the wall openings in said elements and providing unimpeded circumferential flow paths inside the first mixing element and outside the second mixing element of each pair.

3. Apparatus according to claim 1, wherein said deflectors extend inwardly of the walls of the first mixing element and outwardly of the walls of the second mixing element of each said pair with their free edges directed in the same direction as the flows therethrough, for guiding said flows through the wall openings in said elements and provided unimpeded circumferential flow paths outside the first mixing element and inside the second mixing element of each pair.

4. Apparatus according to claim 1, wherein a first mixing element is disposed in said input section and the wall openings and deflectors of said first mixing element are elongated obliquely relative to the axis of said element for imparting to the said flows a component of motion toward said output section.

5. Apparatus according to claim 1, wherein a second mixing element is disposed in said output section and the wall openings and deflectors of said second mixing element are elongated obliquely relative to the axis of said element for imparting to the said flows a component of motion toward said output section.

6. An apparatus for processing cocurrent flows of separable phases, comprising in combination:

(a) a housing having an input section, an output section and an intermediate section therebetween for passing said flows from said input section to said output section, having separate input means connected to said input section for feeding each of said phases thereinto, and having output means connected to said output section for discharging the processed phases therefrom, (b) said intermediate section comprising at least one pair of first and second mixing elements in axial alignment and disposed coaxially in said housing, each of said elements having a cylindrical chamber closed at one end and open at the other end, each pair of said elements being joined together at their open ends, the walls of each of said chambers having wall openings therein for the passage of said flows therethrough, said wall openings being provided with flow guide deflectors extending from said walls for directing the said flows in the same circumferential direction into the chamber of the first mixing element and out of the chamber of the second mixing element, said wall openings and deflectors of said mixing elements being elongated obliquely relative to the axis of said elements for imparting to the said flows a component of motion toward said output section, and (c) a partition extending between said housing and each said pair of mixing elements intermediate the first and second mixing elements thereof for passing at least a principal part of the said flows through the first and second mixing elements of each said pair in sequence.

7. An apparatus for processing cocurrent flows of separable phases, comprising in combination:

(a) a housing having a input section, an output section and an intermediate section therebetween for passing said flow from said input section to said output section, having separate input means connected to said input section for feeding each of said phases thereinto, and having output means connected to said output section for discharging the processed phases therefrom, (b) said intermediate section comprising at least one pair of first and second mixing elements in axial alignment and disposed coaxially in said housing, each of said elements having a cylindrical chamber closed at one end and open at the other end, each pair of said elements being joined together at their open ends, the walls of each of said chambers having wall openings therein for the passage of said flows therethrough, said wall openings being provided with flow guide deflectors extending from said walls for directing the said flows in the same circumferential direction into the chamber of the first mixing element and out of the chamber of the second mixing element, (c) a partition extending between said housing and each said pair of mixing elements intermediate the first and second mixing elements thereof for passing at least a principal part of the said flows through the first and second mixing elements of each said pair in sequence, and (d) said chambers at their closed ends comprising conically shaped flow contour members which project coaxially into said chambers for at least in part streamlining the said flow paths within said chambers.

8. Apparatus according to claim 7, wherein said partition comprises flow contour members having greater width adjacent said housing than adjacent said mixing elements for at least in part streamlining the said flow paths external of said mixing elements.

9. Apparatus according to claim 7, wherein (e) the said wall openings and flow guide deflectors of said mixing elements are elongated obliquely relative to the axis of said elements for imparting to the said flows a component of motion toward said output section.

10. Apparatus according to claim 7, wherein
(e) said flow guide deflectors extend inside of one and outside of the other of a pair of elements.

11. Apparatus according to claim 10, wherein
(e) the said wall openings and flow guide deflectors of said mixing elements are elongated obliquely relative to the axis of said elements for imparting to the said flows a component of motion toward said output section.

* * * * *